United States Patent Office 2,818,367
Patented Dec. 31, 1957

2,818,367

METHOD OF INHIBITING CEREAL PLANT RUST WITH PHENYLHYDRAZONES

Ernest G. Jaworski, Florissant, Mo., and Van R. Gaertner, Dayton, Ohio, assignors to Monsanto Chemical Company, St. Louis, Mo., a corporation of Delaware No Drawing. Application September 21, 1954
Serial No. 457,553

9 Claims. (Cl. 167—30)

This invention relates to biological toxicants, especially those adapted to combatting fungus growth, and more particularly provides new and very effective cereal rust eradicant compositions and methods of treating cereal plants, especially wheat, in which methods such compositions are used.

We have found that very valuable cereal plant rust eradicants are obtained when the active ingredient is a hydrazone having the formula

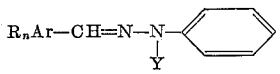

in which Ar denotes an aromatic hydrocarbon nucleus of from 6 to 12 carbon atoms, $n$ is an integer of 1 to 2, and R is selected from the class consisting of hydrogen, halogen, the nitro radical, the sulfonate radical, the cyano radical, the hydroxy radical, an alkyl radical of from 1 to 12 carbon atoms, an alkoxy radical of from 1 to 12 carbon atoms, and an N-alkyl substituted amino radical having from 1 to 5 carbon atoms in the alkyl radical, and Y is selected from the class consisting of hydrogen and an alkyl radical of from 1 to 12 carbon atoms.

The presently useful hydrazones are readily obtainable in known manner by the condensation of benzaldehyde or an appropriately substituted benzaldehyde with phenylhydrazine or a 1-alkyl-1-phenylhydrazine having from 1 to 5 carbon atoms in the alkyl radical.

Hydrazine compounds employed for the preparation of the presently useful hydrazones have the formula

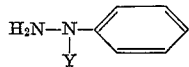

in which Y is hydrogen or an alkyl radical of from 1 to 12 carbon atoms. This includes phenylhydrazine and the 1-alkyl-1-phenylhydrazines such as the 1-methyl-, 1-ethyl-, 1-n-butyl-, 1-isoamyl-, 1-(2-ethylhexyl)-, 1-tert-nonyl-, 1-decyl-, or 1-tert, dodecyl-1-phenylhydrazines.

The presently useful hydrazones are readily obtainable in known manner by condensation of phenylhydrazine or one of said 1-alkyl-1-phenylhydrazines with an aromatic aldehyde of the formula $$(R)_n-Ar-CHO$$

Aromatic aldehydes useful in preparing the presently employed hydrazones are, e. g., benzaldehyde, 1- or 2-naphthaldehyde, and 2-, 3- or 4-biphenylcarboxaldehyde or the nitro, cyano, hydroxy, chloro, alkyl, oxyalkyl, alkylamino or sulfonic derivatives thereof. Of particular utility for the present purpose are the phenylhydrazones or the 1-alkyl-1-phenylhydrazones of benzaldehyde and certain derivatives of benzaldehyde. Such hydrazones have the formula

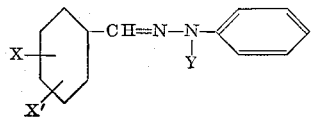

in which X and X' are selected from the class consisting of hydrogen, halogen, the nitro radical, the sulfonate radical, the cyano radical, the hydroxy radical, an alkyl radical of from 1 to 12 carbon atoms, an alkoxy radical of from 1 to 12 carbon atoms, and an N-alkyl-substituted amino radical having from 1 to 5 carbon atoms in the alkyl radical, and Y is selected from the class consisting of hydrogen and alkyl radicals of from 1 to 12 carbon atoms.

The simplest representative of this class, i. e., benzaldehyde phenylhydrazone, is an extremely efficient cereal rust inhibiting agent and that very good rust-inhibiting property is likewise possessed by benzaldehyde 1-alkyl-1-phenylhydrazones having from 1 to 12 carbon atoms in the alkyl radical, e. g., benzaldehyde 1-ethyl-1-phenylhydrazone, benzaldehyde 1-isoamyl-1-phenylhydrazone, benzaldehyde 1-(2-ethylhexyl)-1-phenylhydrazone or benzaldehyde 1-n-dodecyl-1-phenylhydrazone.

Other substituted benzaldehyde phenylhydrazones which are advantageously employed as the effective ingredients of the present cereal rust-eradicant compositions are those having one or two halogen substituents in the aromatic nucleus of the benzaldehyde, e. g., the monohalogenated compounds such as 2-, 3- or 4-bromobenzaldehyde phenylhydrazone or 2-, 3- or 4-iodobenzaldehyde phenylhydrazone, or the dihalogenated compounds such as 2,3-dichlorobenzaldehyde phenylhydrazone, 3,4-dibromobenzaldehyde phenylhydrazone or 2-bromo-4-chlorobenzaldehyde 1-methyl-1-phenylhydrazones.

Compounds having one or two nitro-substituents in the benzaldehyde nucleus are very good cereal rust eradicants. Thus, 2-, 3- or 4-nitrobenzaldehyde phenylhydrazone or 1-n-butyl-1-phenylhydrazone, or 2,3-, 4,5- or 3,4-dinitrobenzaldehyde phenylhydrazone are useful for the present purpose. The nitro radical may be present together with another of the substituents designated in the general formula above in the definition of X and X' thereof; for example, efficient wheat rust eradicants comprising the phenyl hydrazones or the 1-alkyl-1-phenylhydrazones of the following nitro-substituted benzaldehydes are provided by this invention:

4-chloro-2-nitrobenzaldehyde phenylhydrazone
2-bromo-3-nitrobenzaldehyde 1-methyl-1-phenylhydrazone
Sodium 4-formyl-2-nitrobenzenesulfonate phenylhydrazone
3-cyano-4-nitrobenzaldehyde phenylhydrazone
2-hydroxy-4-nitrobenzaldehyde 1-amyl-1-phenylhydrazone
4-n-butyl-2-nitrobenzaldehyde phenylhydrazone
3-dimethylamino-4-nitrobenzaldehyde phenylhydrazone
2-ethoxy-5-nitrobenzaldehyde phenylhydrazone Another class of substituted benzaldehyde phenylhydrazones which we have found also to possess rust-eradicating efficiency comprises the phenylhydrazones or 1-alkyl-1-phenylhydrazones of mono- or di-sulfo-substituted benzaldehydes, e. g., 2-, 3- or 4-formylbenzenesulfonic acid, 2-formylbenzene-3,4-disulfonic acid, 4-formylbenzene-2,3-disulfonic acid or the metal, alkylamine or alkanolamine salts thereof such as the copper, magnesium, potassium, sodium, lithium, dimethylamine or isopropanolamine salts, e. g., copper 4-formylbenzenesulfonate phenylhydrazone or dipotassium 4-formyl-2,3-disulfonate phenylhydrazone. The mono-sulfonate benzaldehyde phenylhydrazones or 1-alkyl-1-phenylhydrazones may also have attached to a carbon atom of the benzaldehyde nucleus another substituent of the class encompassed by X or X'. Thus, the phenylhydrazones of the following aldehydes are useful:

Sodium 2-formyl-3-chlorobenzenesulfonate
Magnesium 2-formyl-4-nitrobenzenesulfonate
2-formyl-4-toluenesulfonic acid 4-cyano-2-formylbenzenesulfonic acid
Sodium 3-formyl-2-hydroxybenzenesulfonate
Potassium 2-methoxy-5-formylbenzenesulfonate
The diisopropylamine salt of 4-diisopropylamino-2-formylbenzenesulfonic acid The phenylhydrazones or 1-alkyl-1-phenylhydrazones of mono- or di-cyano-ar-substituted benzaldehydes are likewise very effective cereal rust eradicants. Thus, there may be used for the present purpose the phenylhydrazone or the 1-amyl-1-phenylhydrazone of 2-, 3- or 4-cyanobenzaldehyde or of 2,3-, 3,4- or 2,5-dicyanobenzaldehyde or the mono-cyano-substituted benzaldehydes having present also at the benzene nucleus a substituent of the type denoted by X or X', e. g., the phenylhydrazone of 2-bromo-3-cyanobenzaldehyde
2-cyano-4-hydroxybenzaldehyde
4-amyl-3-cyanobenzaldehyde
4-methoxy-3-cyanobenzaldehyde
2-cyano-5-diethylaminobenzaldehyde Highly efficient cereal rust eradicants provided by the invention also comprise the phenylhydrazones or the 1-alkyl-1-phenylhydrazones of certain ar-mono- or dialkylated benzaldehydes. Phenylhydrazones of 2-, 3- or 4-alkylbenzaldehydes or the 2,3-, 3,4-, 3,5- or 2,6-dialkylbenzaldehydes having from 1 to 12 carbon atoms in the alkyl radical are generally useful, e. g., 4-tolualdehyde
3-tert-amylbenzaldehyde
3-n-octylbenzaldehyde
2-tert-dodecylbenzaldehyde
2,3-diethylbenzaldehyde
4-amyl-3-n-propylbenzaldehyde
4-dodecyl-2-tolualdehyde Also useful for the present purpose are the phenylhydrazones or the 1-alkyl-1-phenylhydrazones of the mono-ar-alkyl substituted benzaldehydes having in addition to the alkyl substituent another substituent of the type denoted by X or X' above. Examples of such disubstituted benzaldehyde derivatives are:

4-chloro-2-ethylbenzaldehyde phenylhydrazone
3-amyl-5-hydroxybenzaldehyde phenylhydrazone
2-cyano-4-dodecylbenzaldehyde phenylhydrazone
4-n-hexyloxy-3-nonylbenzaldehyde phenylhydrazone
3-nitro-4-tolualdehyde 1-methyl-1-phenylhydrazone
4-ethylamino-2-n-butylbenzaldehyde phenylhydrazone The alkyl radical in the presently useful ar-alkyl-substituted benzaldehyde phenylhydrazones may be straight or branch-chained, e. g., it may be derived from a primary, secondary or tertiary alcohol or alkyl halide or from dimeric, trimeric or tetrameric olefins having a branched structure such as triisobutylene, tripropylene or tetrapropylene. The alkyl radical may also be derived from commercial mixtures of lower olefins or from the mixture of alkyl halides produced by substantial monochlorination of lower paraffinic hydrocarbon fractions, or from alcohols obtained according to the "Oxo" process from olefins, carbon monoxide and hydrogen.

A further class of presently useful phenylhydrazones or 1-alkyl-1-phenylhydrazones are those of the ar-mono- or dihydroxy substituted benzaldehydes, such as 2-, 3- or 4-hydroxybenzaldehyde or 3,4-, 2,6- or 2,3-hydroxybenzaldehyde, e. g., 4-hydroxybenzaldehyde phenylhydrazone, 3-hydroxybenzaldehyde 1-dodecyl-1-phenylhydrazone, 2,3-dihydroxybenzaldehyde 1-n-hexylphenylhydrazone or 3,4-dihydroxybenzaldehyde phenylhydrazone. The benzaldehyde portion of the presently useful phenylhydrazine compounds may be substituted in the aromatic nucleus by one hydroxy radical and other radicals of the type designated above by X or X'. Such compounds are, for example:

3 - hydroxy - 4 - nitrobenzaldehyde 1 - methyl - 1 - phenylhydrazone 4-ethoxy-3-hydroxybenzaldehyde phenylhydrazone
2-keryl-4-hydroxybenzaldehyde phenylhydrazone (where the keryl radical denotes an alkyl radical derived from kerosene)
2-diamylamino-4-hydroxybenzaldehyde phenylhydrazone
2 - chloro - 6 - hydroxybenzaldehyde 1 - n - decyl - 1 - phenylhydrazone The phenylhydrazones or the 1-alkyl-1-phenylhydrazones of ar-mono- or dialkoxy substituted benzaldehydes having from 1 to 12 carbon atoms in the alkoxy radical are also very useful cereal rust eradicants. Thus there may be employed for the present purposes the phenylhydrazone or the 1-methyl-1-phenylhydrazone of such ar-alkoxybenzaldehydes as 4-methoxybenzaldehyde, 4-n-butoxybenzaldehyde, 3-n-octyloxybenzaldehyde, or 2-tert-dodecylbenzaldehyde or the phenylhydrazone or 1-isopropyl-1-phenylhydrazone of such ar-dialkoxybenzaldehydes as 2,3-dimethoxy- or 2,4-di-tert-nonyloxybenzaldehyde, 3 - isoamyloxy - 4 - methoxybenzaldehyde or 2 - n - butoxy - 3 - (2 - ethylhexyloxy)benzaldehyde. Mono-ar-alkoxy-substituted benzaldehyde hydrazine derivatives having besides the one ar-alkoxy radical in the benzaldehyde portion of the molecule another substituent of the class X and X', e. g., —OH, —NO$_2$, CN, —SO$_3$H, or -alkyl, may also be used as effective ingredients of the present rust-eradicant compositions. Such compounds are, for example:

2-chloro-3-methoxybenzaldehyde phenylhydrazone
4 - cyano - 3 - n - propoxybenzaldehyde 1 - ethyl - 1 - phenylhydrazone
Sodium 4-formyl-3-n-octyloxybenzenesulfonate phenylhydrazone
2 - diisobutylamino - 3 - isobutoxybenzaldehyde 1 - isobutyl - 1 - phenylhydrazone.

The ar-alkylamino-substituted benzaldehydes also yield phenylhydrazones which we have found to be very useful in cereal rust prevention and eradication. There may be present in such compounds one or two alkyl radicals attached to the nitrogen of the alkylamino group and each of the so-attached alkyl radicals may have from 1 to 5 carbon atoms. One or two of the alkylamino groups may be present. Examples of such presently useful compounds are:

2-dimethylaminobenzaldehyde 1-dodecyl-1-phenylhydrazone
4-di-n-amylaminobenzaldehyde phenylhydrazone
2-n-dodecylaminobenzaldehyde phenylhydrazone
2,3-bis(diethylamino)benzaldehyde phenylhydrazone Compounds having both an alkylamino radical and another radical of the type X and X' are useful wheat rust eradicants. Such compounds are, for example:

4-n-amylamino-2-hydroxybenzaldehyde phenylhydrazone
3 - cyano - 5 - dimethylaminobenzaldehyde 1 - methyl - 1 - phenylhydrazone
3-bromo-5-di-n-butylaminobenzaldehyde phenylhydrazone While not so economically feasible as are the above benzaldehyde compounds, also very useful as cereal rust eradicants are the phenylhydrazones or the 1-alkyl-1-phenylhydrazones of 1 or 2-naphthaldehyde or of 2-, 3- or 4-biphenylcarboxaldehyde or the derivatives thereof wherein there are present at the aromatic nucleus one or two of the substituents: halogen, nitro, hydroxy, sulfonate, cyano, alkyl, alkoxy and alkylamino, herein designated as X or X'. Exemplary of such naphthaldehyde or biphenylcarboxaldehyde compounds are:

2-hydroxy-1-naphthaldehyde phenylhydrazone
3-cyano-2-naphthaldehyde phenylhydrazone
2,3-dichloronaphthaldehyde phenylhydrazone
2-n-butoxy-4-n-butylnaphthaldehyde phenylhydrazone
5,6-dimethyl-2-naphthaldehyde 1-methyl-1-phenylhydrazone 2-nitro-4-dimethylamino-1-naphthaldehyde phenylhydrazone
2-chloro-4-biphenylcarboxaldehyde phenylhydrazone
4'-hydroxy-4-biphenylcarboxaldehyde 1-n-propyl-1-phenylhydrazone
2,3-dinitro-4-biphenylcarboxaldehyde phenylhydrazone
4-dodecyl-2-biphenylcarboxaldehyde phenylhydrazone The presently employed compounds are particularly valuable in the control of cereal rusts, whereby they function as plant chemotherapeutants against the various leaf and stem rusts of wheat, barley, rye, and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance. In the prior art, much effort has been expended in the past in breeding rust-resistant strains of these cereals; but as new strains of, e. g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance. Also, in this type of application, the range between fungicidally effective concentration and phytotoxic concentration must be much wider and the volatility of the effective compound and carrier must be much less than is required in ground procedures.

The presently useful phenylhydrazones or 1-alkyl-1-phenylhydrazones may be applied directly to the cereal plants; but because these compounds are effective in extremely dilute concentrations, i. e., in concentrations of from, say, 0.01% to 1.0% by weight of the eradicant composition, it is preferred to incorporate them with a carrier or diluent.

Fungicidal dusts may be prepared by mixing the compounds with dusting materials such as talc, clay, lime, bentonite, pumice, fuller's earth, etc. The majority of the phenylhydrazones will be found to be water-insoluble. They may be dissolved in organic solvents therefor and the resulting solutions used as fungicidal or fungi-preventing sprays. More expediently, a small amount of a concentrated solution of the hydrazone compound in an organic solvent, e. g., cyclohexanone, may be added to water in the presence of an emulsifying agent to form an emulsion, and the oil-in-water emulsion thus obtained is employed as a spray. Suspensions or dispersions of the hydrazone compounds in a non-solvent such as water, or aqueous solutions of the water-soluble compounds, are advantageously employed in the treatment of the plant foliage.

The present invention is further illustrated, but not limited, by the following examples:

*Example 1*

The therapeutic effect of benzaldehyde phenylhydrazone was determined as follows:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

100 mg. of the test chemical, i.e., the benzaldehyde phenylhydrazone was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the hydrazone. For the instant test the 1% emulsion was further diluted with water to give a concentration of 0.25% by weight of the test compound.

Spraying of the plants with the emulsion was effected by means of an atomizer, 5 ml. of the emulsion being used per pot of 5. The sprayed plants were then returned to the greenhouse and held there for a week. Observation of the plants at the end of that time disclosed no rust pustules on the inoculated and sprayed plants and no evidence of any phytotoxic effect of the spray. Similarly inoculated, but unsprayed plants, which had been maintained in the incubator and greenhouse for the same length of time were found to be badly affected by the rust.

*Example 2*

This example shows the rust eradicating effect of some alkoxy-substituted benzaldehyde phenylhydrazones. The tests were conducted substantially as described in Example 1, except that the respective emulsions with which the plants were sprayed contained, instead of the 0.25% concentration of benzaldehyde phenylhydrazone, either 4-methoxylbenzaldehyde phenylhydrazone or 3,4-dimethoxybenzaldehyde phenylhydrazone in an 0.5% concentration. A uniform group of five plants was used for each test emulsion. Inspection of the inoculated plants one week after spraying showed no rust pustules on those of the plants which had been sprayed with the 4-methoxybenzaldehyde phenylhydrazone and a very small number of rust pustules on only one of the five plants which had been sprayed with the emulsion of 3,4-dimethoxybenzaldehyde phenylhydrazone. No phytotoxic effect of either emulsion was evidenced.

*Example 3*

This example is like Example 2 except that instead of the methoxy-substituted benzaldehyde phenylhydrazones, respective 0.5% emulsions of the following phenylhydrazones were respectively used instead:

Benzaldehyde 1-methyl-1-phenylhydrazone
4-cyanobenzaldehyde phenylhydrazone
2-nitrobenzaldehyde phenylhydrazone
2,4-dichlorobenzaldehyde phenylhydrazone
3,4-dichlorobenzaldehyde phenylhydrazone
2-hydroxybenzaldehyde phenylhydrazone Inspection of the inoculated plants 1 week after spraying showed no rust pustules.

*Example 4*

In this example, sodium 2-formylbenzenesulfonate phenylhydrazone was tested against wheat rust as in Example 1; an 0.5% concentration of the present compound was used. Inspection of the inoculated and sprayed plants at the end of the week showed very slight pustule formation as compared to similarly inoculated but unsprayed "blank" test specimens. The sprayed plants showed no evidence of phytotoxic effect.

Example 5

2-hydroxy-4-methoxybenzaldehyde phenylhydrazone was tested against wheat rust as in Example 1, except that it was employed at an 0.5% concentration, at which concentration complete inhibition of pustule formation was noted upon inspection of the inoculated plants one week after spraying.

Example 6

4-tolualdehyde phenylhydrazone was tested against wheat rust at a concentration of 0.25 percent, employing the testing procedure of Example 1. Inspection of the inoculated and sprayed plants at the end of one week showed no rust pustules.

Example 7

α-Naphthaldehyde phenylhydrazone was tested against wheat rust as in Example 1, except that it was employed at an 0.5% concentration. Inspection of the inoculated and sprayed plants showed that, of the five test plants, only one exhibited any evidence of rust infection.

Example 8

When 4-dimethylaminobenzaldehyde phenylhydrazone was submitted to the test procedure of Example 2, complete inhibition of rust growth was noted at the 0.5% concentration, at which concentration there was no evidence of phytotoxicity.

What we claim is:

1. The method of inhibiting the development of rust on cereal plants which comprises applying to said plants a rust inhibiting quantity of an eradicant composition containing as the essential active ingredient a hydrazone having the formula

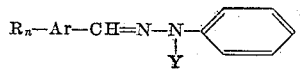

in which Ar denotes an aromatic hydrocarbon nucleus of from 6 to 12 carbon atoms, $n$ is an integer of 1 to 2, and R is selected from the class consisting of hydrogen, halogen, the nitro radical, the sulfonate radical, the cyano radical, the hydroxy radical, an alkyl radical of from 1 to 12 carbon atoms, an alkoxy radical of from 1 to 12 carbon atoms, and an N-alkyl substituted amino radical having from 1 to 5 carbon atoms in the alkyl radical, and Y is selected from the class consisting of hydrogen and an alkyl radical of from 1 to 12 carbon atoms.

2. The method of inhibiting the development of rust on cereal plants which comprises applying to said plants a rust inhibiting quantity of an eradicant composition containing as an essential active ingredient a monoalkylbenzaldehyde phenylhydrazone having from 1 to 12 carbon atoms in the alkyl radical.

3. The method of inhibiting the development of rust on cereal plants which comprises applying to said plants a rust inhibiting quantity of an eradicant composition containing as an essential active ingredient a monoalkoxybenzaldehyde phenylhydrazone having from 1 to 12 carbon atoms in each alkoxy radical.

4. The method of inhibiting the development of rust on cereal plants which comprises applying to said plants a rust inhibiting quantity of an eradicant composition containing as an essential active ingredient a mono-(dialkylamino)benzaldehyde phenylhydrazone having from 1 to 5 carbon atoms in each alkyl radical.

5. The method of inhibiting the development of rust on wheat which comprises applying to the wheat a rust inhibiting quantity of an eradicant composition comprising benzaldehyde phenylhydrazone as the essential active ingredient.

6. The method of inhibiting the development of rust on wheat which comprises applying to the wheat a rust inhibiting quantity of an eradicant composition comprising 4-methoxybenzaldehyde phenylhydrazone as the essential active ingredient.

7. The method of inhibiting the development of rust on wheat which comprises applying to the wheat a rust inhibiting quantity of an eradicant composition comprising 4-dimethylaminobenzaldehyde phenylhydrazone as the essential active ingredient.

8. The method of inhibiting the development of rust on wheat which comprises applying to the wheat a rust inhibiting quantity of an eradicant composition comprising 4-tolualdehyde phenylhydrazone as the essential active ingredient.

9. The method of inhibiting the development of rust on wheat which comprises applying to the wheat a rust inhibiting quantity of an eradicant composition comprising 2-hydroxybenzaldehyde phenylhydrazone as the essential active ingredient.

References Cited in the file of this patent

UNITED STATES PATENTS

| 2,054,062 | Bonrath | Sept. 15, 1936 |

FOREIGN PATENTS

| 460,545 | Germany | June 1, 1928 |

OTHER REFERENCES

Bushland: Jour. of Econ. Entomology, vol. 33 (1940), pp. 669–676.